US011087010B2

(12) United States Patent
Bender et al.

(10) Patent No.: US 11,087,010 B2
(45) Date of Patent: Aug. 10, 2021

(54) MENTAL ACUITY-DEPENDENT ACCESSIBILITY

(71) Applicant: International Business Machines Corporation, Armonk, NY (US)

(72) Inventors: Michael Bender, Rye Brook, NY (US); Gregory J. Boss, Saginaw, MI (US); Jeremy R. Fox, Georgetown, TX (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 15/609,509

(22) Filed: May 31, 2017

(65) Prior Publication Data
US 2018/0349626 A1 Dec. 6, 2018

(51) Int. Cl.
*G06N 20/00* (2019.01)
*G06F 21/62* (2013.01)
*G06F 21/32* (2013.01)

(52) U.S. Cl.
CPC .......... *G06F 21/6218* (2013.01); *G06F 21/32* (2013.01); *G06N 20/00* (2019.01); *G06F 2221/2111* (2013.01)

(58) Field of Classification Search
CPC .............. G06F 21/6218; G06N 99/005; G06Q 2240/00
See application file for complete search history.

(56) References Cited

U.S. PATENT DOCUMENTS

| 8,018,329 | B2 | 9/2011 | Morgan et al. |
| 8,799,669 | B2 | 8/2014 | Goi |
| 9,043,329 | B1 | 5/2015 | Patton et al. |
| 9,779,352 | B1 | 10/2017 | Hyde et al. |
| 2007/0225770 | A1 | 9/2007 | Lapanashvili |
| 2011/0148634 | A1 | 6/2011 | Putz |
| 2013/0099977 | A1 | 4/2013 | Sheshadri et al. |

(Continued)

FOREIGN PATENT DOCUMENTS

WO 2016112052 A1 7/2016

OTHER PUBLICATIONS

Munmun De Choudhury, Michael Gamon, Scott Counts, and Eric Horvitz, "Predicting Depression via Social Media", Jul. 1, 2013, Association for the Advancement of Artificial Intelligence, pp. 1-10. (Year: 2013).*

(Continued)

*Primary Examiner* — Kamran Afshar
*Assistant Examiner* — Ying Yu Chen
(74) *Attorney, Agent, or Firm* — William E. Schiesser

(57) ABSTRACT

In an approach to adjusting user permissions based on mental acuity, one or more computer processors determine whether an individual is within a threshold proximity to a monitored location. In response to determining that an individual is within a threshold proximity to the monitored location, the one or more computer processors identify a required mental acuity for the monitored location. The one or more computer processors determine a current mental acuity for the individual. The one or more computer processors compare the determined mental acuity for the individual with the required mental acuity for the monitored location.

17 Claims, 3 Drawing Sheets

(56) References Cited

U.S. PATENT DOCUMENTS

| | | | |
|---|---|---|---|
| 2014/0155094 A1 | 6/2014 | Zises | |
| 2014/0164118 A1 | 6/2014 | Polachi | |
| 2014/0357295 A1 | 12/2014 | Skomra et al. | |
| 2015/0123766 A1* | 5/2015 | St. John | G07C 9/257 340/5.84 |
| 2015/0199547 A1 | 7/2015 | Fraccaroli | |
| 2017/0053513 A1* | 2/2017 | Savolainen | A61B 5/18 |
| 2017/0178431 A1 | 6/2017 | Ashenfelter et al. | |
| 2017/0187710 A1* | 6/2017 | Cutwater | H04L 63/0861 |
| 2017/0293356 A1 | 10/2017 | Khaderi | |
| 2018/0199877 A1* | 7/2018 | Kukawka | A61B 5/02055 |
| 2018/0315335 A1* | 11/2018 | Mangum | G09B 19/00 |

OTHER PUBLICATIONS

Eric Daniel Marks and Jochen Teizer, "Method fortesting proximity detection and alert technology for safe construction equipment operation", 2013, Construction Management and Economics, vol. 31, No. 6, pp. 636-646. (Year: 2013).*

Choudhury et al., "Predicting Depression via Social Media", Copyright © 2013, Association for the Advancement of Artitical Intelligence (www.aaai.org), Jul. 1, 2013, 11 pages.

Appendix P, List of IBM Patents or Patent Applications Treated as Related, 2 pages, dated Jan. 9, 2018.

Bender et al., "Mental Acuity-Dependent Accessibility", U.S. Appl. No. 15/848,071, filed Dec. 20, 2017, 29 pages.

Pongpaichet et al., "Situation Fencing: Making Geo-Fencing Personal and Dynamic", PDM'13, Oct. 22, 2013, Barcelona, Spain, Copyright © 2013 ACM, 8 pages.

"A Client Registration Method to Ensure Integrity of Custom Data on Enterprise Repositories", An IP.com Prior Art Database Technical Disclosure, Authors et. al.: Disclosed Anonymously, IP.com No. IPCOM000210954D, IP.com Electronic Publication Date: Sep. 19, 2011, 5 pages.

North Star BlueScope Steel Taps IBM Watson and Wearable Devices to Monitor Activity of Workers in Extreme Environments, PR Newswire, a cision company, News provided by IBM, Jun 23, 2016, 6 pages, <http://www.prnewswire.com/news-releases/north-star-bluescope-steel-taps-ibm-watson-and-wearable-devices-to-monitor-activity-of-workers-in-extreme-environments-300289168.html>.

"System and Method for Defining and Enforcing Data Localization", An IP.com Prior Art Database Technical Disclosure, Authors et. al.: Disclosed Anonymously, IP.com No. IPCOM000247196D, IP.com Electronic Publication Date: Aug. 16, 2016, 6 pages.

Krzysztof Rozanowski, Michal Bemat, and Agnieszka Kaminska, "Estimation of Operators' Fatigue Using Optical Methods for Determination of Pupil Activity", 2015, International Journal of Occupational Medicine and Environmental Health 2015:28(2), p. 263-281. (Year: 2015).

Oliver Bergamin and Randy H. Kardon, "Latency of the Pupil Light Reflex: Sample Rate, Stimulus Intensity, and Variation in Normal Subjects", Apr. 2003, Investigative Ophthalmology & Visual Science, vol. 44, No. 4, p. 1546-1554. (Year: 2003).

S. Tsujimura, J.S. Wolffsohn, and B. Gilmartin, "Pupil responses associated with coloured afterimages are mediated by the magnocellular pathway", 2003, Vision Research 43 (2003), p. 1423-1432. (Year: 2003).

* cited by examiner

MENTAL ACUITY-DEPENDENT ACCESSIBILITY

BACKGROUND OF THE INVENTION

The present invention relates generally to the field of data analytics, and more particularly to sensor-based data analytics.

Analytics using deep machine learning is based on a design to model high level abstractions in data by using a deep graph with multiple processing layers, composed of multiple linear and non-linear transformations. Deep learning is part of a broader family of machine learning methods based on learning representations of data. One of the uses of deep learning is replacing handcrafted features for unsupervised or semi-supervised feature learning and hierarchical feature extraction. Research in this area attempts to make better representations and create models to learn these representations from large-scale unlabeled data. Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks.

SUMMARY

Embodiments of the present invention disclose a method, a computer program product, and a system for adjusting user permissions based on mental acuity. The method may include one or more computer processors determine whether an individual is within a threshold proximity to a monitored location. In response to determining that an individual is within a threshold proximity to the monitored location, the one or more computer processors identify a required mental acuity for the monitored location. The one or more computer processors determine a current mental acuity for the individual. The one or more computer processors compare the determined mental acuity for the individual with the required mental acuity for the monitored location.

DETAILED DESCRIPTION

The present day prevalence and rapid expansion of the sensing capabilities of client devices allows for the application of analytics to new types of data gathered from various sensor arrays. As such, the flow and use of information essential to improving a user experience can benefit from the application of analytics to new categories of data, such as data from microphones, cameras, pressure sensors, gyroscopic sensors, and biometric sensors, identified using the expanded capabilities of modern client devices. By applying analytics to sensor data, an improved user experience is possible. For example, the detection and recording of unique movement, facial expression, and biometric data associated with a client device provides analytics programs with detailed information about the specific objects a user interacts with on a day to day basis, such as stoves, refrigerators, computers, and electromechanical devices. As a result, a sensor-based analytics program can make specific inferences based on user activity patterns associated with particular devices to help a user avoid injury and maximize efficiency. Embodiments of the present invention recognize that utilizing sensor data improves the efficacy of analytics by providing more relevant information to the user and better managing a technological ecosystem. Further, coupling sensor data with advanced analytical techniques, such as machine learning algorithms and cognitive computing, allows for a dynamic and real-time management of a technological ecosystem thereby increasing efficiency. By improving the efficacy and efficiency of the management of a technological ecosystem, a user, such as a factory owner and employees, can more quickly adapt to and more effectively address variables in a rapidly changing technological ecosystem. For example, real-time monitoring of mental acuity in a workplace and dynamically changing employee permissions based on current levels of mental acuity can drastically improve safety in environments containing dangerous machinery. Implementation of embodiments of the invention may take a variety of forms, and exemplary implementation details are discussed subsequently with reference to the Figures.

Figure 1:
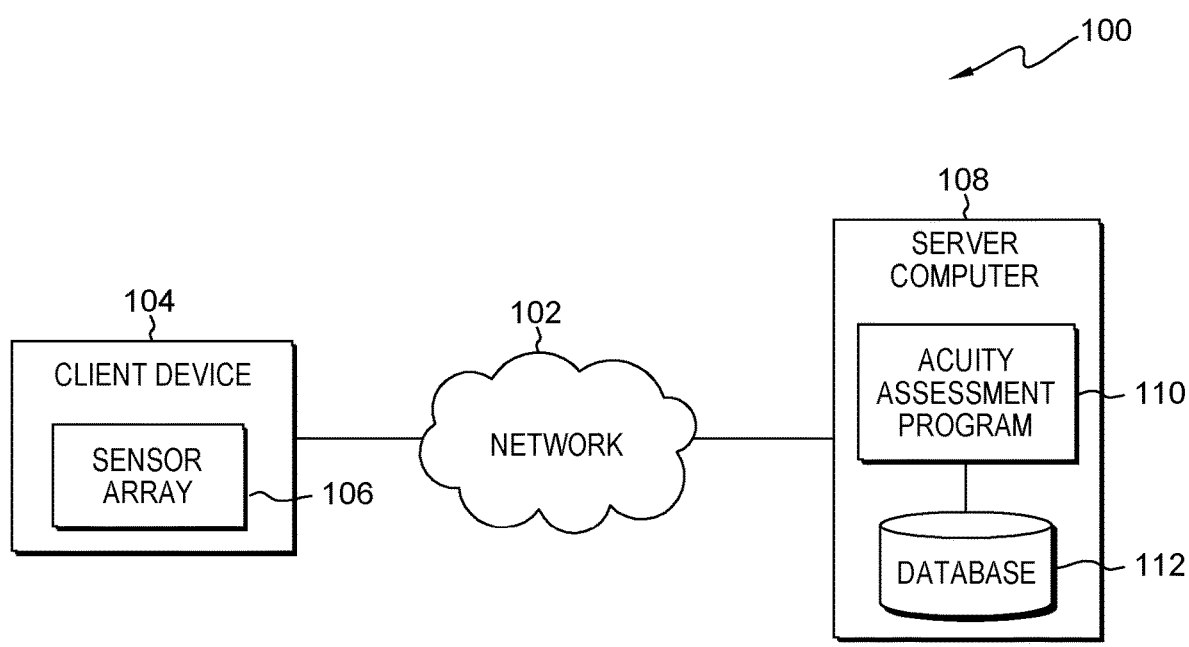
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client device 104 and server computer 108, and other devices (not shown) within distributed data processing environment 100.

Client device 104 can be any programmable electronic client device with one or more sensors capable of communicating with various components and devices, such as a laptop computer, a tablet computer, or a smart phone, within distributed data processing environment 100, via network 102. In general, client device 104 represents any programmable electronic client device or combination of programmable electronic client devices capable of executing machine readable program instructions, manipulating executable machine readable instructions, collecting sensor data, and communicating with server computer 108 and other client devices (not shown) within distributed data processing environment 100 via a network, such as network 102. Client device 104 includes an instance of sensor array 106. Client device 104 and sensor array 106 allow acuity assessment program 110 to analyze sensor data associated with a series of interactions with client device 104 to specify and collect statistics on the mental acuity status of a user.

Sensor array 106 provides interaction data to acuity assessment program 110 on server computer 108 for a user of client device 104. Sensor array 106 may include any combination of sensors, such as microphones, cameras, pressure sensors, gyroscopic sensors, and biometric sensors. Sensor array 106 may be contained in more than one device. In one example, sensor array 106 may collect sensor data from a biometric sensor, an image sensor, a microphone, a gyroscopic sensor, an accelerometer, or any combination thereof. Further sensor data collected from sensor array 106 is not limited to the embodiment discussed herein and may include any sensor data from any sensor array available in the art. For example, sensor array 106 may include a microphone and camera from a smartphone and a biometric heart rate sensor from a smart watch interconnected to server computer 108 over network 102. Each sensor in sensor array 106 may communicate independently or in concert with acuity assessment program 110 through network 102. Further, one or more sensors in sensor array 106 may be separate devices and/or be present on separate devices. For example, sensor array 106 may be separate devices or contained on one or more separate devices from client device 104. In one embodiment, sensor array 106 may be paired with a mobile application software that communicates between a client device 104 and acuity assessment program 110 on server computer 108. Mobile application software, or an "app," is a computer program designed to run on smart phones, tablet computers and other mobile devices.

Server computer 108 can be a standalone client device, a management server, a web server, a mobile client device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes acuity assessment program 110 and database 112. Server computer 108 may include internal and external hardware components, as depicted and described in further detail with respect to FIG. 3.

Acuity assessment program 110 initiates shortly after a user interaction with client device 104 is detected by sensor array 106, such as movements, changes from biometric baselines, sounds, and visuals. Sensor data may include any data recorded directly from sensor array 106 or associated with the data collected from sensor array 106. For example, acuity assessment program 110 may collect sensor data, such as heart rate data from a biometric sensor on a smartwatch, record the time of day the collection of sensor data was performed, and record the calculated deviation from the historical sensor data. Following the first set of sensor data, acuity assessment program 110 records the first set of sensor data. Using the first set of sensor data, acuity assessment program 110 determines the baseline data characteristics associated with established baseline mental acuity for the user. A set of sensor data may be data collected at one or more points in time by one or more sensors. For example, sensor data from various sensors may associate an average resting heart rate of eighty beats per minute, non-erratic movements, and a particular tone of voice with established baseline mental acuity for the user after collecting twelve data points over twelve hours. In another example, baseline data characteristics associated with established baseline mental acuity may be general standards set by a third party, such as a regulatory agency, and any deviation from the baseline data characteristics, such as a heart rate of 120 beats-per-minute and a pupil dilation of greater than five millimeters, may deem a user unfit to carry out particular tasks. As a result, acuity assessment program 110 may establish a baseline data characteristic associated with established baseline mental acuity for a user using the sensor data. Acuity assessment program 110 receives a subsequent set of sensor data. In one example, sensor array 106 may constantly monitor the sensor data and may not send acuity assessment program 110 a subsequent set of sensor data until the sensor data deviates from the established baseline data characteristics. In another example, sensor array 106 may be integrated into the same computing device as acuity assessment program 110. Acuity assessment program 110 analyzes the subsequent set of sensor data to determine the mental acuity of the user. Acuity assessment program 110 determines whether the sensor data indicates a change in mental acuity from the baseline data characteristics associated with established baseline mental acuity for the user. Responsive to determining that the sensor data does not indicate a change in mental acuity from the baseline, acuity assessment program 110 returns to receive a subsequent set of sensor data. Responsive to determining that the sensor data does indicate a change in mental acuity from the baseline, acuity assessment program 110 adjusts user permissions based on the level of mental acuity. Acuity assessment program 110 records mental acuity data. Mental acuity data may be any data, such as sensor data, baseline mental acuity data, mental acuity deviations calculated from baseline, data associated with the collection of sensor data, and predictive analytics data. Acuity assessment program 110 analyzes mental acuity data to predict user behavior. Acuity assessment program 110 is depicted and described in further detail with respect to FIG. 2.

Database 112 is a repository for data used and stored by acuity assessment program 110. In the depicted embodiment, database 112 resides on server computer 108. In another embodiment, database 112 may reside elsewhere within distributed data processing environment 100 provided acuity assessment program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 may store sensor data, mental acuity data, and any other relevant data associated with a client device, such as client device 104. Database 112 may also store data and parameters, such as baseline data characteristics associated with established baseline mental acuity for one or more users, for the purpose of determining the extent of deviations from the established baseline mental acuity of a user. Database 112 may also store data associated with the historical sensor data, user permissions, restrictions based on regulatory standards, and historical mental acuity data of a user of client device 104. Restrictions based on regulatory standards may be set by a third party, such as an employer or government agency, to establish baseline data characteristics associated with established baseline or sufficient mental acuity. For example, biometric information indicating the presence of an active ingredient in a particular prescribed medicine in the bloodstream of a user may fall under a category of chemicals that disqualify a user from driving-related tasks.

Figure 2:
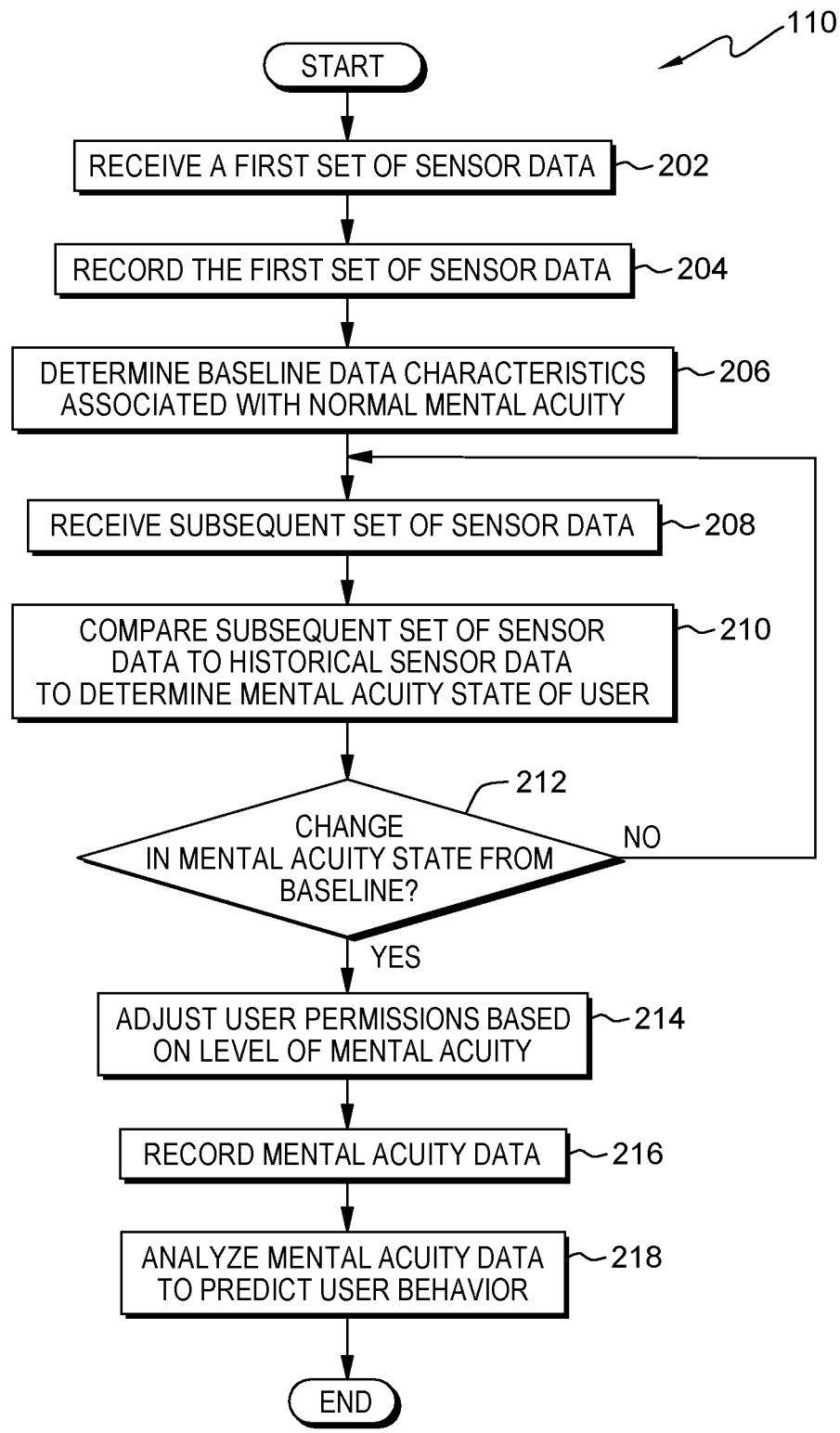
FIG. 2 is a flowchart depicting operational steps of an acuity assessment program, on a server computer within the distributed data processing environment of FIG. 1, for dynamically adjusting user permissions based on mental acuity, in accordance with an embodiment of the present invention.

FIG. 2 is a flowchart depicting operational steps of acuity assessment program 110, on server computer 108 within distributed data processing environment 100 of FIG. 1, a program for dynamically adjusting user permissions based on mental acuity, in accordance with an embodiment of the present invention. Acuity assessment program 110 initiates after a user interaction with client device 104 is detected by sensor array 106, such as movements, changes from biometric baselines, sounds, and visuals. Acuity assessment program 110 continues to run until acuity assessment program 110 analyzes the mental acuity data of a user of acuity assessment program 110 using various methods to predict user mental acuity, such as applying predictive analytics to predict the mental acuity of a user.

Acuity assessment program 110 receives a first set of sensor data associated with a user (step 202). Sensor data may include any data recorded directly from sensor array 106 or associated with the data collected from sensor array 106. For example, acuity assessment program 110 may collect sensor data, such as heart rate data from a biometric sensor on a smartwatch, record the time of day the collection of sensor data was performed, and record the calculated deviation from the historical sensor data. Sensor data may also include information associated with data collected by sensor array 106, such as the time of data collection, rate of data collection, and type of data collected. A set of sensor data may be data collected at one or more points in time by one or more sensors. For example, sensor array 106 may collect a set of sensor data by recording heart rate, sounds, and movement in twelve data points over twelve hours. In one embodiment, acuity assessment program 110 receives a first set of sensor data associated with a user over network 102. For example, acuity assessment program 110 may be a web-based application hosted on a server. A client device 104, such as a smartwatch, may send the first set of sensor data wirelessly though the Internet via network 102 to acuity assessment program 110 on server computer 108.

Acuity assessment program 110 may collect the first set of sensor data by sensor array 106 passively, actively through participation by a user of client device 104, and a combination of both passive and active sensor data collections. For example, an employer may passively monitor an employee for data, such as heart rate and movement. In another example, the employer may require the employee to take a picture of the employee's eye before entering the heavy machinery facilities to collect pupillary response data to test for alertness. In yet another example, the employer may test the sweat of the employee through biometric sensors to measure the amount of perspiration and test for any substances impairing established baseline cognitive and motor function. In yet another example, an employer may passively monitor an employee for data, such as heart rate and movement, and require an employee to actively input pupillary response data through a smartphone camera before entering a heavy machinery facility to test for sobriety. The collection of data from one or more sensors in sensor array 106 may be collected at any time separately or together.

Acuity assessment program 110 records the first set of sensor data (step 204). In one embodiment, acuity assessment program 110 may record the first set of sensor data to database 112. In another embodiment, acuity assessment program 110 may retrieve information from outside sources, such as regulatory guidelines or industry guidelines, instead of recording a first set of sensor data to subsequently establish required data characteristics associated with established baseline mental acuity. For example, acuity assessment program 110 may parse the language of regulations from a government agency, such as the U.S. Department of Health and Human Services, and use the dosage levels associated with established baseline mental acuity for a particular substance in place of the first set of sensor data. However, a set of sensor data may be recorded or retrieved in any manner accessible to acuity assessment program 110.

Acuity assessment program 110 analyzes the first set of sensor data to determine the baseline data characteristics associated with established baseline mental acuity for the user (step 206). Baseline data characteristics may include any data characteristics associated with a required mental acuity for a user. For example, baseline data characteristics may include one or more data characteristics associated with the mental for a user meeting one or more performance requirements, such as a minimum eye tracking speed and/or a lower heart rate indicating higher tolerance to environmental stressors. In one embodiment, established baseline mental acuity may be defined by a user of acuity assessment program 110, such as setting parameters for what constitutes baseline data characteristics associated with established baseline mental acuity based on particular types of collected sensor data. For example, an employer may define baseline data characteristics associated with an established baseline mental acuity as 70-80 heart beats per minute, sound levels below twenty decibels, and facial expressions under a threshold of deviation from the resting state of a face.

In another embodiment, established baseline mental acuity may be defined by machine learning algorithms applied to a particular user after a period of data collection. For example, to determine baseline data characteristics for a user with established baseline mental acuity, acuity assessment program 110 may analyze any sensor data associated with a user, such as biometric data, voice data, and image data, and data associated with the sensor data, such as the time of data collection, the frequency of data collection, and the types of data collected. Acuity assessment program 110 may utilize various machine-learning algorithms including, but not limited to, regression analysis using supervised learning classifiers and time-series models to identify and predict an established baseline mental acuity in a user of acuity assessment program 110.

Acuity assessment program 110 receives a subsequent set of sensor data (step 208). However, if acuity assessment program 110 did not receive a first set of sensor data, then acuity assessment program 110 may use the subsequent set of sensor data as the first set of sensor data to establish baseline data characteristics associated with an established baseline mental acuity of a user. Client device 104 containing sensor array 106 may send a subsequent set of sensor data at regular intervals or irregular intervals. For example, a user of acuity assessment program 110 may instruct sensor array 106 on client device 104 to collect image, sound, and movement data once at the start of every hour. In another example, a user of acuity assessment program 110 may instruct sensor array 106 to collect image, sound, and movement data twice per hour from the hours of 6:00 A.M. to 6:00 P.M. and collect image, sound, and movement data once per hour from the hours of 6:00 P.M. to 6:00 A.M. The subsequent set of sensor data may include any combination of sensor data. For example, a user of acuity assessment program 110 may instruct sensor array 106 to collect image, sound, and movement data twice per hour from the hours of 6:00 A.M. to 6:00 P.M. and collect only sound and movement data once per hour from the hours of 6:00 P.M. to 6:00 A.M. In an alternative embodiment, sensor array 106 may constantly monitor the sensor data and may not send acuity assessment program 110 a subsequent set of sensor data until the sensor data deviates from the established baseline data characteristics. In yet another embodiment, sensor array 106 may be integrated into the same computing device as acuity assessment program 110. However, acuity assessment program 110 may receive a subsequent set of sensor data in any manner available.

Acuity assessment program 110 compares the subsequent set of sensor data to historical sensor data to determine the mental acuity of the user (step 210). In one embodiment, acuity assessment program 110 may make a comparison the subsequent set of sensor data to baseline data characteristics associated with an established baseline mental acuity of a user from historical data, such as historical sensor data. Historical data may also fall under different types of historical data based on one or more variables, such as the types of sensors collecting data and the accompanying types of sensor data collected by acuity assessment program 110. For example, acuity assessment program 110 may compare a set of sensor data indicating a heart rate of 110 beats per minute from a biometric sensor, excessive perspiration from a moisture sensor, and slower than average pupillary response from an image sensor to historical sensor data establishing established baseline mental acuity for the user as a heart rate between 70-80 beats per minute, minimal perspiration, and an average pupillary light reflex latency of less than one millisecond.

In an alternative embodiment, acuity assessment program 110 may receive baseline data characteristics associated with established baseline mental acuity from a user of acuity assessment program 110, such as a product manufacturer. For example, a manufacturer requiring the use of heavy machinery to create products may define the established baseline mental acuity required for competently handling of the heavy machinery with biometric data indicating a heart rate between seventy and eighty beats per minute, low perspiration, and a pupillary reflex latency of less than two milliseconds.

In another embodiment, acuity assessment program 110 may determine the baseline data characteristics associated with established baseline mental acuity using analytics. For example, acuity assessment program 110 may compare a subsequent set of sensor data associated with an employee attempting to access heavy machinery to the baseline data characteristics historically associated with the mental acuity required to safely operate heavy machinery as determined by various analytical techniques, such as cross-referencing injury reports with aggregated employee sensor data and applying predictive analytics to establish a baseline.

Acuity assessment program 110 determines whether the sensor data indicates a change in mental acuity from the baseline data characteristics associated with established baseline mental acuity for the user (decision block 212). In one embodiment, acuity assessment program 110 may determine that the sensor data associated with a user falls outside the parameters of the baseline data characteristics associated with established baseline mental acuity. For example, acuity assessment program 110 may determine that a heart rate of 100 beats per minute, excessive perspiration, and a pupil reflex latency of three milliseconds of a user fails to meet the heart rate of seventy to eighty beats per minute, minimal perspiration, and a pupil reflex latency of less than one millisecond associated with established baseline mental acuity for the user.

In another embodiment, acuity assessment program 110 may determine that the sensor data associated with a user falls outside of the parameters of pre-determined baseline data characteristics associated with established baseline mental acuity. For example, acuity assessment program 110 may determine that a heart rate of 100 beats per minute, excessive perspiration, and a pupil reflex latency of three milliseconds of a user fails to meet the seventy to eighty beats per minute, minimal perspiration and pupil reflex latency of less than one millisecond associated with established baseline mental acuity as pre-determined by a company in the company operations policy.

Responsive to determining that the sensor data does not indicate a change in mental acuity from the baseline ("No" branch, decision block 212), acuity assessment program 110 returns to receive a subsequent set of sensor data (step 208). In an embodiment, if the baseline data characteristics of a subsequent set of sensor data do not deviate outside of a set range of values indicating established baseline mental acuity, then acuity assessment program 110 returns to receive another subsequent set of sensor data to analyze for changes in mental acuity.

Responsive to determining that the sensor data indicates a change in mental acuity from the baseline ("Yes" branch, decision block 212), acuity assessment program 110 adjusts user permissions based on the level of mental acuity (step 214). In an embodiment, if the baseline data characteristics of a subsequent set of sensor data deviate outside of a set range of values indicating established baseline mental acuity, then acuity assessment program 110 adjust user permissions based on the level of mental acuity. For example, acuity assessment program 110 may determine that the sensor data indicates a heart rate of ten beats per minute below average, excessive perspiration compared to average perspiration, and a pupil reflex latency of five milliseconds for an employee attempting to access a facility containing heavy machinery. Based on the sensor data, acuity assessment program 110 may adjust user permissions to restrict the employee from accessing any heavy machinery.

In another example, acuity assessment program 110 may determine that sensor data indicating a heart rate of ten beats per minute above a predetermined range of baseline data characteristics associated with the required mental acuity for a user is associated with a low level of mental acuity by falling outside of a predetermined range of baseline data characteristics associated with the required mental acuity for the user.

In yet another example, acuity assessment program 110 may determine that a set of sensor data indicating perspiration below a predetermined range of baseline data characteristics associated with the required mental acuity for the user is associated with a heightened mental acuity by falling outside of a predetermined range of baseline data characteristics associated with the required mental acuity for the user. Based on the sensor data, acuity assessment program 110 may grant additional user permissions to an individual that allows access to heavy machinery.

In yet another example, acuity assessment program 110 may determine that a set of sensor data indicating a heart rate and a level of perspiration within a predetermined range of baseline data characteristics associated with the required mental acuity for the user is associated with an acceptable mental acuity that falls within a predetermined range of baseline data characteristics associated with the required mental acuity for the user.

In yet another example, acuity assessment program 110 may determine that the sensor data indicates a heart rate of ten beats per minute above average, excessive perspiration compared to average perspiration, and a pupil reflex latency of five milliseconds for an employee attempting to access a facility containing machinery with high heat applications. Based on the sensor data, acuity assessment program 110 may adjust user permissions to restrict the employee from accessing any facilities with an average ambient temperature of eighty degrees or higher to avoid a higher risk of heat exhaustion indicated by the sensor data.

In yet another example, acuity assessment program 110 may determine that the sensor data indicates a heart rate of ten beats per minute below average, minimal perspiration compared to average perspiration, and a pupil reflex latency of less than one millisecond for an employee attempting to access a facility containing heavy machinery. Based on the sensor data, acuity assessment program 110 may adjust user permissions to expand access to heavier machinery to take advantage of a state of higher-than-established baseline mental acuity indicated by the sensor data.

In yet another example, acuity assessment program 110 may determine that the sensor data indicates a heart rate of five beats per minute below average, average perspiration levels, and a pupil reflex latency of less than one millisecond for an employee attempting to access a facility containing various machinery. Based on the sensor data, acuity assessment program 110 may adjust user permissions to allow access to light machinery and restrict access to heavy machinery to cater to the slight deviation in mental acuity from the baseline data characteristics associated with established baseline mental acuity.

User permissions may include any parameters that may be manipulated by a user or acuity assessment program 110 or directly by acuity assessment program 110. In one embodiment, user permissions may include preset geolocation-based permissions based on a mental acuity level associated with a user. For example, a manufacturer may configure acuity assessment program 110 to determine which facilities a user may access depending on the mental acuity level indicated by the sensor data associated with the user. In another embodiment, user permissions may include geolocation-based permissions determined by machine learning algorithms. For example, acuity assessment program 110 may determine a range of permitted movement and boundaries around particular equipment based on a reduced level of mental acuity associated with a user. Further illustrating this example, acuity assessment program 110 may weigh a series of factors using machine learning algorithms to determine the extent of deviation from established baseline data characteristics and dynamically adjust the allowable distance for a user in relation to a dangerous piece of machinery, such as a boiler. If the user falls within the established baseline data characteristics associated with acceptable mental acuity, then acuity assessment program 110 removes geolocation-based permissions to allow free movement. If the user does not fall within the established baseline data characteristics after acuity assessment program 110 determines the user is moderately impaired, then acuity assessment program 110 may use an algorithm to adjust how close a user is permitted to be to a boiler.

Acuity assessment program 110 may block user access to restricted facilities based on user access permissions, such as facilities containing higher risks of injury or confidential information. User access permissions may include variable restrictions, such as distance, use authorization, duration and notifications, based on a fall in mental acuity from an established baseline mental acuity for a user. For example, acuity assessment program 110 may increase restrictions based on a user with an elevated heart rate and increased perspiration by increasing the distance the user must be from certain machines, disallowing the use of particular machines requiring a higher level of mental acuity to operate, reducing the amount of time a user may use particular machines, and sending a notification to a manager detailing the fall in mental acuity from an established baseline mental acuity. User access permissions may also include variable privileges, such as distance, use authorization, and duration, based on the change in mental acuity from an established baseline mental acuity for a user. For example, acuity assessment program 110 may increase privileges based on a user with a normal heart rate, normal pupil dilation, and reduced cortisol levels in the bloodstream by allowing the user to access machines requiring high mental acuity to operate, increasing the amount of time the user may operate particular machinery, and decreasing the distance the user may be to particularly dangerous areas and/or machines.

In another embodiment, user permissions may include item-specific permissions. For example, a manufacturer may configure acuity assessment program 110 to determine which particular machines a machine worker may access based on the level of mental acuity of the employee as indicated by the sensor data collected from the employee. In another example, a manufacturer may configure acuity assessment program 110 to determine which computer programs an employee may access based on the level of mental acuity of the employee as indicated by the sensor data collected from the employee.

Acuity assessment program 110 records mental acuity data. (step 216). Mental acuity data includes any data related to the adjusting of user permissions based on the subsequent set of sensor data from sensor array 106. For example, mental acuity data may record the day, the time, the type of sensor data, the sensor data, and type of adjustment made of each incident of an adjustment of user permission based on changes in mental acuity. In one embodiment, acuity assessment program 110 may record the mental acuity data to database 112. However, a set of mental acuity data may be recorded in any manner accessible to acuity assessment program 110.

Acuity assessment program 110 analyzes mental acuity data to predict user behavior (step 218). In one embodiment, acuity assessment program 110 may analyze mental acuity data using machine learning algorithms applied to a particular user after a period of data collection. For example, to predict future user mental acuity based on historical mental acuity data, acuity assessment program 110 may use a time-series model to determine which times in the day and days of the week that an employee, such as a machine worker, operates with peak mental acuity. Based on the results, acuity assessment program 110 may provide an operator of acuity assessment program 110, such as an employer, with crucial data to maximize the efficiency and safety of workers. In another embodiment, acuity assessment program 110 may use a regression analysis based on supervised learning classifiers to determine user-specific behaviors indicating an increase or decrease in mental acuity. For example, acuity assessment program 110 may estimate the relationships among different variables provided by mental acuity data to determine that a higher-than-average heart rate for a particular user correlates with more controlled movements and lower rates of injury for the particular user. As a result, acuity assessment program 110 may expand user permissions based on the analyzed mental acuity data which predict higher mental acuity at a higher-than-average heart rate. However, acuity assessment program 110 may analyze mental acuity data through any available method to predict user behavior and is not limited to the embodiment discussed herein.

Figure 3:
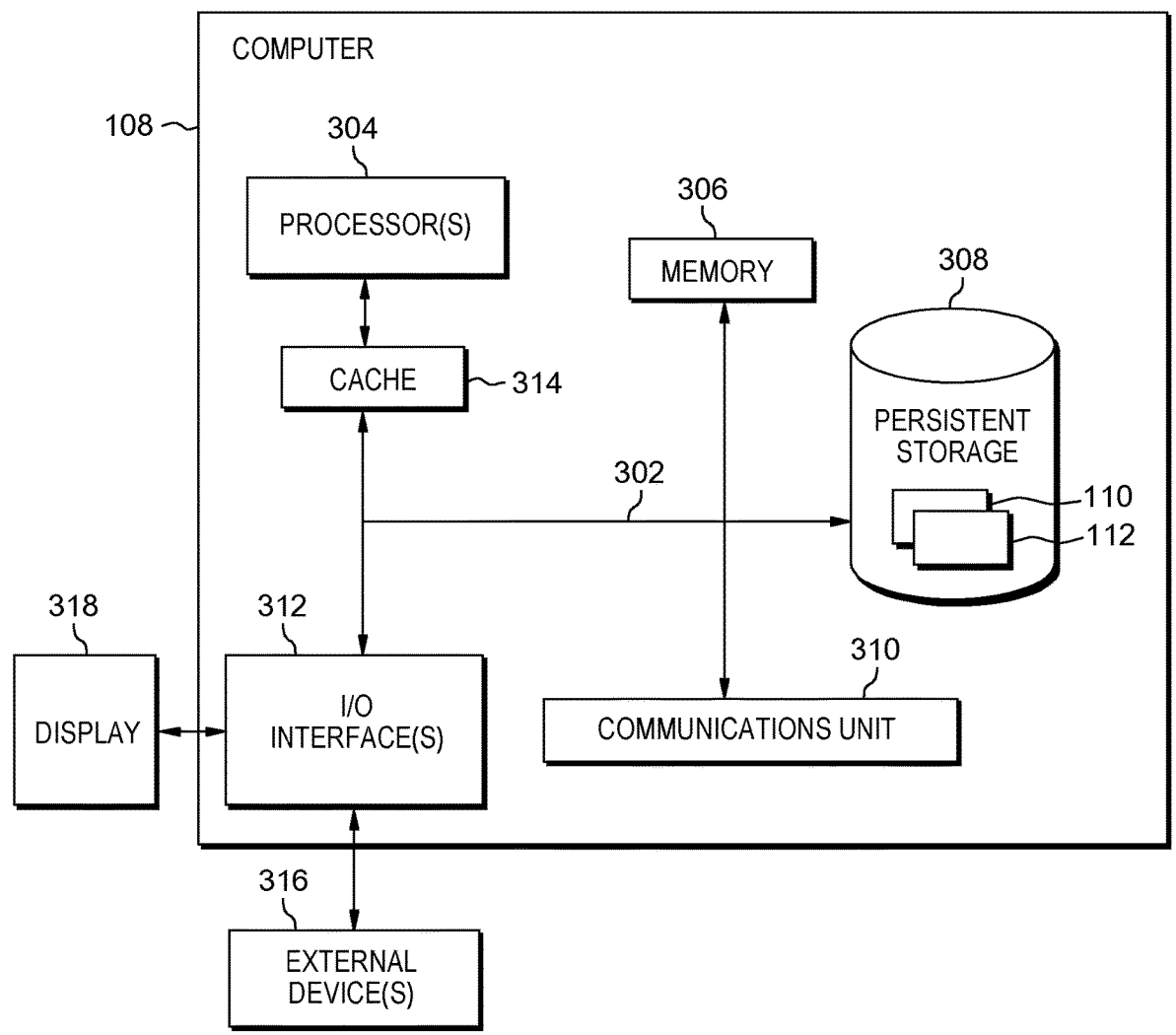
FIG. 3 depicts a block diagram of components of the server computer executing the acuity assessment program within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., acuity assessment program 110 and database 112, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client device 104. In these examples, communications unit 310 includes one or more network interface cards. Communications unit 310 may provide communications through the use of either or both physical and wireless communications links. Acuity assessment program 110, database 112, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., acuity assessment program 110 and database 112 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
  determining, by one or more processors, that an individual is within a threshold proximity to a monitored location associated with a plurality of devices based on input from a sensor array monitoring the monitored location;
  identifying, by the one or more computer processors, a required mental acuity to access at least one device of the plurality of devices associated with the monitored location;
  determining, by the one or more computer processors, a current mental acuity for the individual based on the input from the sensor array monitoring the monitored location;
  determining, by the one or more computer processors, an established baseline mental acuity by applying a supervised learning classifier and a time-series model to the historical data associated with the individual;
  comparing, by the one or more computer processors, the determined mental acuity for the individual with (i) the required mental acuity to access the at least one device of the plurality of devices and (ii) the established baseline mental acuity of the individual; and adjusting, by the one or more processors, a geolocation-based permission associated with the at least one device of the plurality of devices based, at least in part, on the comparison of the determined mental acuity for the individual with the required mental acuity to access the at least one device, wherein the geolocation-based permission indicates a permitted distance of the individual in regards to the at least one device and the permitted distance is determined based on the comparison of the determined mental acuity for the individual with the required mental acuity to access the at least one device.

2. The method of claim 1, wherein adjusting, by the one or more processors, the geolocation-based permission associated with the at least one device, further comprises:

responsive to determining that the mental acuity of an individual at least meets the required mental acuity for the individual to access the at least one device, increasing, by the one or more computer processors, the permitted distance associated with the individual and the at least one device.

3. The method of claim 1, wherein adjusting, by the one or more processors, the geolocation-based permission associated with the at least one device, further comprises:

responsive to determining that the mental acuity of an individual falls below the required mental acuity for the individual to access the at least one device, decreasing, by the one or more computer processors, the permitted distance associated with the individual and the at least one device.

4. The method of claim 1, wherein comparing, by the one or more computer processors, the determined mental acuity for the individual with the required mental acuity for access to the at least one device includes comparing current mental acuity data of the individual to the required mental acuity level that is preset based on one or more performance requirements.

5. The method of claim 1, wherein comparing, by the one or more computer processors, the determined mental acuity for the individual with the required mental acuity for access to the at least one device includes comparing current mental acuity data of the individual to the required mental acuity level that is based on regulations associated with the monitored location.

6. The method of claim 1, further comprising: determining, by the one or more computer processors, one or more data characteristics associated with an increased mental acuity, the established baseline mental acuity, and a decreased mental acuity for one or more types of historical data associated with the individual; and comparing, by the one or more computer processors, the current mental acuity of the individual to the established baseline mental acuity of the individual by making one or more determinations associated with the increased mental acuity, the established baseline mental acuity, and the decreased mental acuity for the one or more types of historical data associated with the individual.

7. A computer program product comprising:

one or more computer readable storage media and program instructions stored on the one or more computer readable storage media, the stored program instructions comprising:

program instructions to determine that an individual is within a threshold proximity to a monitored location associated with a plurality of devices based on input from a sensor array monitoring the monitored location;

program instructions to identify a required mental acuity to access at least one device of the plurality of devices associated with the monitored location;

program instructions to determine a current mental acuity for the individual based on the input from the sensor array monitoring the monitored location;

program instructions to determine an established baseline mental acuity by applying a supervised learning classifier and a time-series model to the historical data associated with the individual;

program instructions to compare the determined mental acuity for the individual with (i) the required mental acuity to access the at least one device of the plurality of devices and (ii) the established baseline mental acuity of the individual; and program instruction to adjust a geolocation-based permission associated with the at least one device of the plurality of devices based, at least in part, on the comparison of the determined mental acuity for the individual with the required mental acuity to access the at least one device, wherein the geolocation-based permission indicates a permitted distance of the individual in regards to the at least one device and the permitted distance is determined based on the comparison of the determined mental acuity for the individual with the required mental acuity to access the at least one device.

8. The computer program product of claim 7, wherein program instruction to adjust the geolocation-based permission associated with the at least one device, further comprises:

responsive to determining that the mental acuity of an individual at least meets the required mental acuity for the individual to access the at least one device, program instructions to increase the permitted distance associated with the individual and the at least one device.

9. The computer program product of claim 7, wherein program instruction to adjust, by the one or more processors, the geolocation-based permission associated with the at least one device, further comprises:

responsive to determining that the mental acuity of an individual falls below the required mental acuity for the individual to access the at least one device, program instructions to decrease the permitted distance associated with the individual and the at least one device.

10. The computer program product of claim 7, wherein program instructions to compare the determined mental acuity for the individual with the required mental acuity for access to the at least one device includes program instructions to compare current mental acuity data of the individual to the required mental acuity level that is preset based on one or more performance requirements.

11. The computer program product of claim 7, wherein program instructions to compare the determined mental acuity for the individual with the required mental acuity for access to the at least one device includes program instructions to compare current mental acuity data of the individual to the required mental acuity level that is based on regulations associated with the monitored location.

12. The computer program product of claim 7, further comprising: program instructions to determine one or more data characteristics associated with an increased mental acuity, the established baseline mental acuity, and a decreased mental acuity for one or more types of historical data associated with the individual; and program instructions to compare the current mental acuity of the individual to the established baseline mental acuity of the individual by making one or more determinations associated with the increased mental acuity, the established baseline mental acuity, and the decreased mental acuity for the one or more types of historical data associated with the individual.

13. A computer system comprising:
one or more computer processors;
one or more computer readable storage media;
program instructions stored on the one or more computer readable storage media for execution by at least one of the one or more computer processors, the stored program instructions comprising:
program instructions to determine that an individual is within a threshold proximity to a monitored location associated with a plurality of devices based on input from a sensor array monitoring the monitored location;
program instructions to identify a required mental acuity to access at least one device of the plurality of devices associated with the monitored location;
program instructions to determine a current mental acuity for the individual based on the input from the sensor array monitoring the monitored location;
program instructions to determine an established baseline mental acuity by applying a supervised learning classifier and a time-series model to the historical data associated with the individual;
program instructions to compare the determined mental acuity for the individual with (i) the required mental acuity to access the at least one device of the plurality of devices and (ii) the established baseline mental acuity of the individual; and
program instruction to adjust a geolocation-based permission associated with the at least one device of the plurality of devices based, at least in part, on the comparison of the determined mental acuity for the individual with the required mental acuity to access the at least one device, wherein the geolocation-based permission indicates a permitted distance of the individual in regards to the at least one device and the permitted distance is determined based on the comparison of the determined mental acuity for the individual with the required mental acuity to access the at least one device.

14. The computer system of claim 13, wherein program instruction to adjust the geolocation-based permission associated with the at least one device, further comprises:
responsive to determining that the mental acuity of an individual at least meets the required mental acuity for the individual to access the at least one device, program instructions to increase the permitted distance associated with the individual and the at least one device.

15. The computer system of claim 13, wherein program instruction to adjust the geolocation-based permission associated with the at least one device, further comprises:
responsive to determining that the mental acuity of an individual falls below the required mental acuity for the individual to access the at least one device, program instructions to decrease the permitted distance associated with the individual and the at least one device.

16. The computer system of claim 13, wherein program instructions to compare the determined mental acuity for the individual with the required mental acuity for access to the at least one device includes program instructions to compare current mental acuity data of the individual to the required mental acuity level that is preset based on one or more performance requirements.

17. The computer system of claim 13, further comprising: program instructions to determine one or more data characteristics associated with an increased mental acuity, the established baseline mental acuity, and a decreased mental acuity for one or more types of historical data associated with the individual; and program instructions to compare the current mental acuity of the individual to the established baseline mental acuity of the individual by making one or more determinations associated with the increased mental acuity, the established baseline mental acuity, and the decreased mental acuity for the one or more types of historical data associated with the individual.

* * * * *